United States Patent
Ono et al.

(10) Patent No.: US 12,477,085 B2
(45) Date of Patent: Nov. 18, 2025

(54) IMAGE INFORMATION PROVISION DEVICE AND METHOD, ON-BOARD UNIT OF VEHICLE TO TRANSMIT CAPTURED IMAGE AT COLLETION POINT, AND NON-TRANSITORY COMPUTER READABLE MEDIUM

(71) Applicant: MITSUBISHI HEAVY INDUSTRIES, LTD., Tokyo (JP)

(72) Inventors: Hidekazu Ono, Kobe (JP); Kozaburo Konishi, Kobe (JP); Yoshifumi Hayakawa, Kobe (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 292 days.

(21) Appl. No.: 18/069,276

(22) Filed: Dec. 21, 2022

(65) Prior Publication Data
US 2023/0209019 A1    Jun. 29, 2023

(30) Foreign Application Priority Data
Dec. 28, 2021  (JP) ................. 2021-214024

(51) Int. Cl.
  H04N 7/18      (2006.01)
  G06F 16/783    (2019.01)
  G06V 10/74     (2022.01)
  G06V 20/54     (2022.01)
(52) U.S. Cl.
  CPC .......... *H04N 7/185* (2013.01); *G06F 16/786* (2019.01); *G06V 10/761* (2022.01); *G06V 20/54* (2022.01)

(58) Field of Classification Search
None
See application file for complete search history.

(56) References Cited

U.S. PATENT DOCUMENTS

| 7,818,123 B2* | 10/2010 | Inoue ................. G01C 21/3602 701/426 |
| 2013/0322692 A1* | 12/2013 | Guan .................... G06V 20/58 382/103 |
| 2018/0288502 A1* | 10/2018 | Higuchi ................... H04Q 9/00 |
| 2019/0394427 A1* | 12/2019 | Zhao ....................... G06V 20/54 |

(Continued)

FOREIGN PATENT DOCUMENTS

| JP | 2002063694 A | 2/2002 |
| JP | 2003198905 A | 7/2003 |

(Continued)

OTHER PUBLICATIONS

Machine Translation in English of JP Pub 2020060871 A to Honda et al.*

*Primary Examiner* — Haris Sabah
(74) *Attorney, Agent, or Firm* — Osha Bergman Watanabe & Burton LLP

(57) ABSTRACT

An image information provision device includes: a setting unit configured to set a collection point or a collection section for an image on a target road; and an image acquisition unit configured to request an on-board unit of a vehicle present within a predetermined range from the collection point or the collection section to transmit a captured-image captured at the collection point or in the collection section, and store, in a storage, a captured-image received from the on-board unit that has received the request.

8 Claims, 16 Drawing Sheets

(56) References Cited

U.S. PATENT DOCUMENTS

| | | |
|---|---|---|
| 2021/0303883 A1 | 9/2021 | Jumonji et al. |
| 2023/0110089 A1 | 4/2023 | Ogata |

FOREIGN PATENT DOCUMENTS

| | | |
|---|---|---|
| JP | 2010039674 A | 2/2010 |
| JP | 2018166292 A | 10/2018 |
| JP | 2020-60871 A | 4/2020 |
| JP | 2021163146 A | 10/2021 |
| WO | 2020022042 A1 | 1/2020 |
| WO | 2021192194 A1 | 9/2021 |

* cited by examiner

<COLLECTION CONDITION LIST D1>

| | Target road (traveling direction) | Collection point/ collection section | View mode | Collection period |
|---|---|---|---|---|
| Collection condition 1 | Highway HW1 (inbound lane) | Point X1 | Still view | |
| Collection condition 2 | Highway HW1 (inbound lane) | Points X2 to X3 | Live View | 10:00 to 14:00 |
| Collection condition 3 | Highway HW2 (outbound lane) | 3 mins from point X4 | Stream view | Until acquisition for 10 vehicles |

FIG. 7

<TRAVELING VEHICLE LIST D2>

| Target road: highway HW1 | | | |
|---|---|---|---|
| Vehicle identification information (on-board unit ID) | Entry point (entrance ID) | Travel direction | Entry date and time |
| A1 | Entrance 01 | Inbound lane | ***** |
| A2 | Entrance 02 | Inbound lane | ***** |
| A3 | Entrance 02 | Inbound lane | ***** |
| A4 | Entrance 05 | Outbound lane | ***** |

FIG. 9

IMAGE INFORMATION PROVISION DEVICE AND METHOD, ON-BOARD UNIT OF VEHICLE TO TRANSMIT CAPTURED IMAGE AT COLLETION POINT, AND NON-TRANSITORY COMPUTER READABLE MEDIUM

CROSS-REFERENCE TO RELATED APPLICATIONS

This application claims the benefit of priority to Japanese Patent Application Number 2021-214024 filed on Dec. 28, 2021. The entire contents of the above-identified application are hereby incorporated by reference.

TECHNICAL FIELD

The disclosure relates to an image information provision device, an on-board unit, an image information provision method, and a program.

RELATED ART

In highways and the like, a fixed camera is installed on a road side to monitor the occurrence of an event that hinders smooth travel of vehicles, such as road debris, accidents, and traffic jams in driving lanes. However, it is difficult to promptly know that such an event has occurred at a location where a fixed camera is not installed, for example. For this reason, it is necessary to monitor such a location by dispatching a maintenance vehicle, and managing the safety of the road takes time and effort.

As a technique for confirming the travel status of a vehicle, for example, JP 2020-60871 A describes a signage system that includes an information collection device mounted on a bus and including a camera that captures a video of the surroundings of the camera and an antenna for transmitting the video, and a signage that is installed at a station and that displays the video received from the information collection device. The video captured by the information collection device is constantly transmitted to the signage and displayed. This allows a user to visually confirm the travel status (operation status) of the bus via the signage at a station.

SUMMARY

However, with the technique described in JP 2020-60871 A, since transmission/reception of the video is constantly performed between the information collection device and the signage, communication load is very large. In addition, the video is limited to a time point at which the bus is traveling. Therefore, when an event such as road debris occurs on the road after the bus passes, for example, it may be difficult to find out the occurrence of such an event from the video captured by the bus.

The disclosure has been made in view of such a problem, and provides an image information provision device, an on-board unit, an image information provision method, and a program that can collect an image from an on-board unit of a vehicle traveling at a point or in a section without a fixed camera.

According to one aspect of the disclosure, the image information provision device includes: a setting unit configured to set a collection point or a collection section for an image on a target road; and an image acquisition unit configured to request an on-board unit of a vehicle present within a predetermined range from the collection point or the collection section to transmit a captured-image captured at the collection point or in the collection section, and store, in a storage, a captured-image received from the on-board unit that has received the request.

According to one aspect of the disclosure, the on-board unit mounted in a vehicle includes: a camera configured to capture a captured-image of an area around the vehicle; a positioning unit configured to generate positioning information including a position of the vehicle measured based on a satellite signal; a condition acquisition unit configured to acquire a collection condition indicating a collection point or a collection section for a captured-image to be transmitted to an image information provision device; a determination unit configured to determine whether the vehicle has arrived at the collection point or the collection section based on the positioning information; and an image transmission processing unit configured to, in a case where it is determined that the vehicle has arrived at the collection point or the collection section, transmit the captured-image captured by the camera to the image information provision device.

According to one aspect of the disclosure, the image information provision method includes: setting a collection point or a collection section for an image on a target road; and requesting an on-board unit of a vehicle present within a predetermined range from the collection point or the collection section to transmit a captured-image captured at the collection point or in the collection section, and storing, in a storage, a captured-image received from the on-board unit that has received the request.

According to one aspect of the disclosure, the program causes an image information provision device to execute: setting a collection point or a collection section for an image on a target road; and requesting an on-board unit of a vehicle present within a predetermined range from the collection point or the collection section to transmit a captured-image captured at the collection point or in the collection section, and storing, in a storage, a captured-image received from the on-board unit that has received the request.

According to one aspect of the disclosure, the program causes an on-board unit mounted in a vehicle to execute: capturing, by a camera, a captured-image forward in a traveling direction of the vehicle; generating positioning information including a position of the vehicle measured based on a satellite signal; acquiring a collection condition indicating a collection point or a collection section for a captured-image to be transmitted to an image information provision device; determining whether the vehicle has arrived at the collection point or the collection section based on the positioning information; and, in a case it is determined that the vehicle has arrived at the collection point or the collection section, transmitting the captured-image to the image information provision device.

According to the image information provision device, on-board unit, image information provision method, and program according to the disclosure, it is possible to collect an image from an on-board unit of a vehicle traveling at a point or in a section without a fixed camera.

BRIEF DESCRIPTION OF DRAWINGS

The disclosure will be described with reference to the accompanying drawings, wherein like numbers reference like elements.

FIG. 7 is a view illustrating an example of a collection condition list according to the first embodiment of the disclosure.

FIG. 9 is a diagram illustrating an example of a traveling vehicle list according to the first embodiment of the disclosure.

DESCRIPTION OF EMBODIMENTS

First Embodiment

Hereinafter, an image information provision system 1 according to a first embodiment of the disclosure will be described with reference to FIGS. 1 to 11.

Overall Configuration

Figure 1:
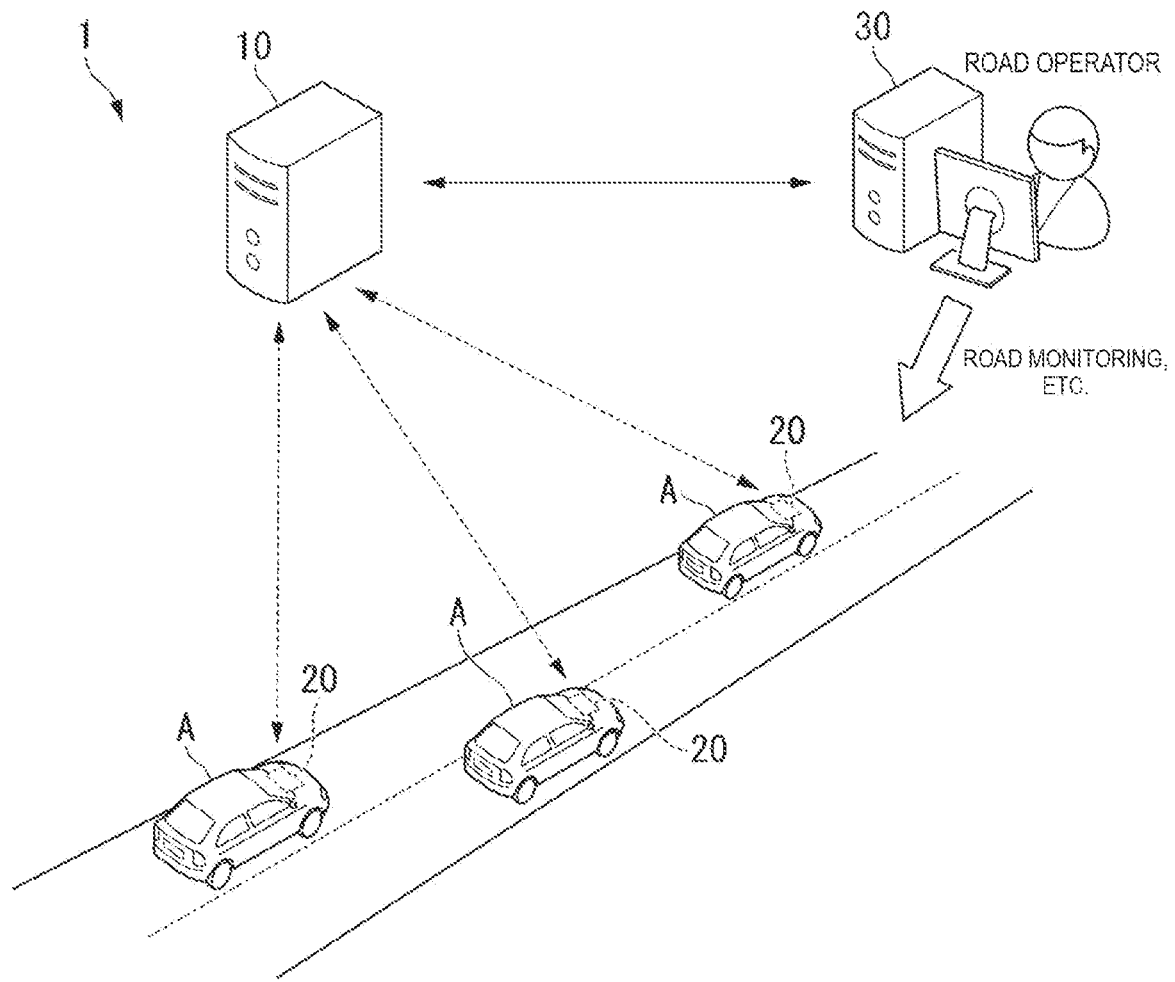
FIG. 1 is a diagram illustrating an overall configuration of an image information provision system according to a first embodiment of the disclosure.

FIG. 1 is a diagram illustrating the overall configuration of an image information provision system according to the first embodiment of the disclosure.

The image information provision system 1 according to the present embodiment is a system used to confirm the state of a target road using an image (video). The target road is, for example, a highway. As illustrated in FIG. 1, the image information provision system 1 includes an image information provision device 10, an on-board unit 20, and a host server 30.

The image information provision device 10 is connected to the on-board unit 20 by wireless communication, and collects an image (hereinafter, also referred to as "captured-image") captured by the on-board unit 20 of a point or a section where the target road needs to be monitored. The image information provision device 10 generates an image for monitoring (hereinafter, also referred to as "monitoring image") based on a captured-image collected from the on-board unit 20, and provides the monitoring image to the host server 30. The captured-image includes a still image and a video.

One on-board unit 20 is mounted on each of a plurality of vehicles A. The on-board unit 20 transmits a captured-image captured by a camera to the image information provision device 10 in response to a request from the image information provision device 10. The on-board unit 20 is, for example, a dashboard camera with a communication function. Alternatively, the on-board unit 20 may be an on-board unit capable of communicating with road side communication equipment (e.g., a roadside communication device) such as an on-board unit for an electronic toll collection system (ETC). The on-board unit 20 may also be configured such that an existing on-board camera or a dashboard camera without a communication function is used as a camera. Furthermore, in another embodiment, the on-board unit 20 may be a combination of a dashboard camera with a communication function using Wi-Fi (registered trademark) and a mobile terminal (e.g., smartphone or tablet). The mobile terminal receives a captured-image captured by the dashboard camera via Wi-Fi communication using an application installed in advance, and transmits the received captured-image to the image information provision device 10.

The host server 30 is a device used by a road operator (business operator that manages and operates highways), for example, to monitor a target road. For example, the host server 30 transmits a signal for requesting, to the image information provision device 10, a point or a section of a target road to be monitored in response to an operation by an inspector working for the road operator or the like. Then, the image information provision device 10 provides the host server 30 with a captured-image of the designated point or section as a monitoring image. The monitoring image provided from the image information provision device 10 is displayed on a display of the host server 30. The inspector confirms whether an event such as road debris, an accident, or a traffic jam has occurred on the target road by referring to the monitoring image displayed by the host server 30. In another embodiment, the host server 30 may perform image recognition using AI to automatically detect the event on the target road.

Functional Configuration of Image Information Provision Device

Figure 2:
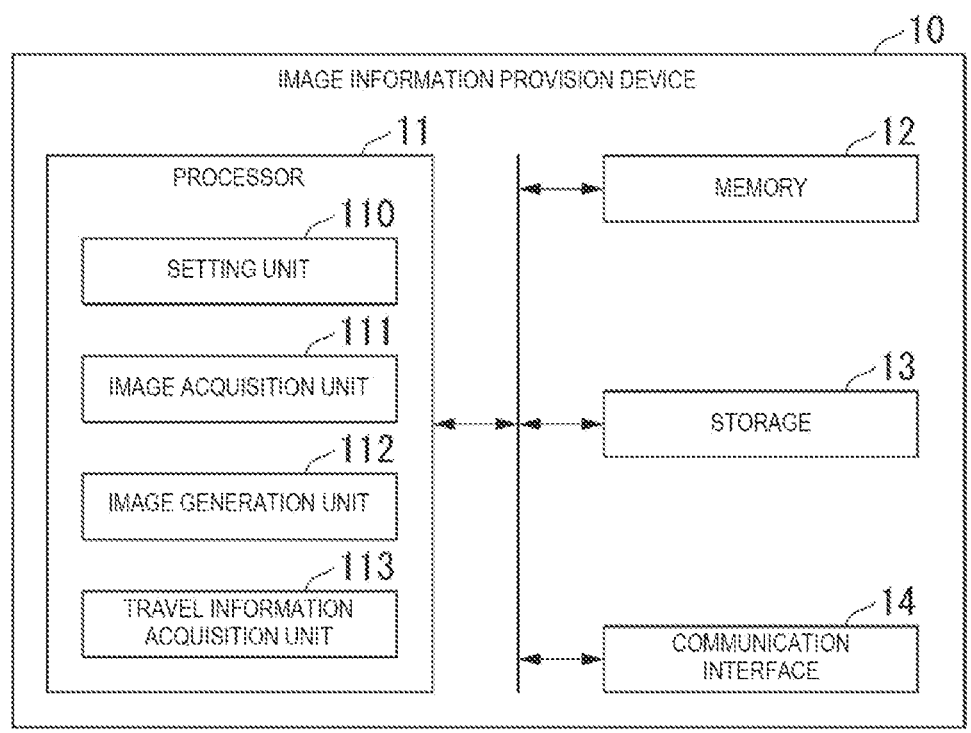
FIG. 2 is a diagram illustrating a functional configuration of an image information provision device according to the first embodiment of the disclosure.

FIG. 2 is a diagram illustrating the functional configuration of an image information provision device according to the first embodiment of the disclosure.

As illustrated in FIG. 2, the image information provision device 10 includes a processor 11, a memory 12, a storage 13, and a communication interface 14.

The processor 11 is, for example, a CPU, and executes processing of the image information provision device 10. The function of the processor 11 will be described later.

The memory 12 has a memory area necessary for the operation of the processor 11.

The storage 13 is a so-called auxiliary storage device and is, for example, a hard disk drive (HDD) or a solid state drive (SSD).

The communication interface 14 is an interface for transmitting/receiving information with external devices (the on-board unit 20 and the host server 30).

Next, the function of the processor 11 will be described. By operating according to predetermined programs, the processor 11 achieves functions as a setting unit 110, an image acquisition unit 111, an image generation unit 112, and a travel information acquisition unit 113.

The setting unit 110 sets a collection point or a collection section in an image on the target road.

The image acquisition unit 111 transmits, to the on-board unit 20 of the vehicle A present within a predetermined range from the collection point or the collection section, a signal for requesting transmission of a captured-image captured at the collection point or in the collection section. The image acquisition unit 111 stores, in the storage 13, the captured-image received from the on-board unit 20 that has received the request.

The image generation unit 112 generates a monitoring image of the collection point or collection section based on the captured-image received from the on-board unit 20 that has received the request.

The travel information acquisition unit 113 acquires information indicating whether the vehicle A is traveling on the target road.

Functional Configuration of On-board Unit

Figure 3:
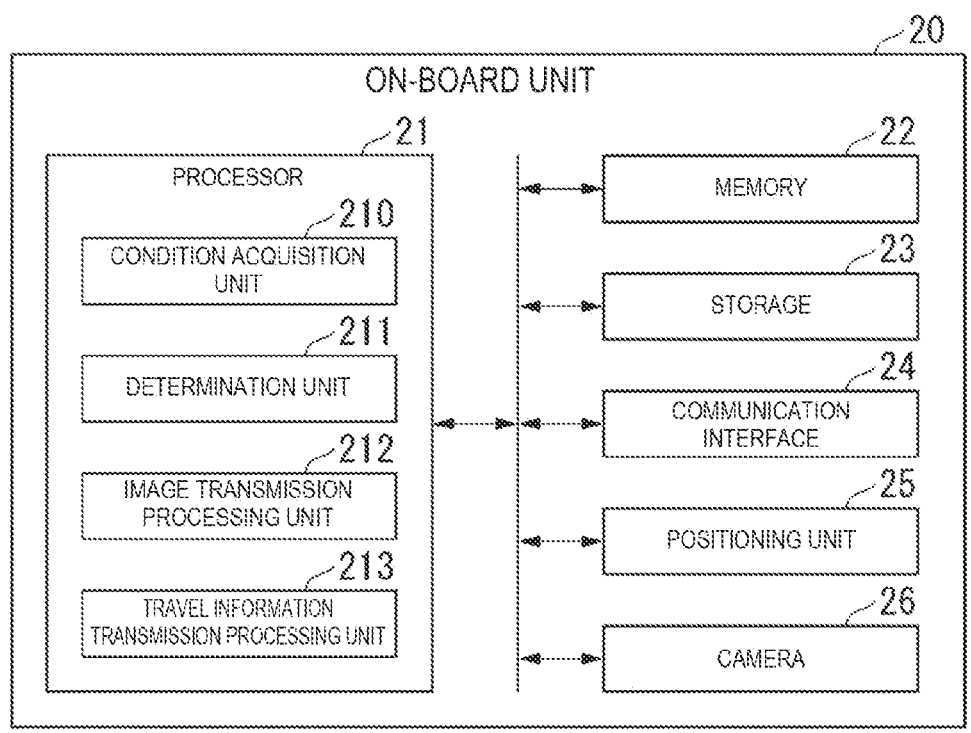
FIG. 3 is a diagram illustrating a functional configuration of an on-board unit according to the first embodiment of the disclosure.

FIG. 3 is a diagram illustrating the functional configuration of an on-board unit according to the first embodiment of the disclosure. As illustrated in FIG. 3, the on-board unit 20 includes a processor 21, a memory 22, a storage 23, a communication interface 24, a positioning unit 25, and a camera 26.

The processor 21 is, for example, a CPU, and executes processing of the on-board unit 20. The function of the processor 21 will be described later.

The memory 22 has a memory area necessary for the operation of the processor 21.

The storage 23 is a so-called auxiliary storage device and is, for example, a hard disk drive (HDD) or a solid state drive (SSD).

The communication interface 24 is an interface for transmitting/receiving information with an external device (the image information provision device 10).

The positioning unit 25 generates positioning information including a position of the vehicle A measured based on a satellite signal received from a global navigation satellite system (GNSS) satellite. The positioning information may include the speed of the vehicle A. The positioning unit 25 continues to generate positioning information at a constant frequency while the on-board unit 20 is activated. The positioning unit 25 may perform map matching using the positioning information and map data stored in advance in the storage 23 to further identify the position of the vehicle A on the map data corresponding to each piece of positioning information. In another embodiment, positioning information of the positioning unit 25 may be sequentially transmitted to the image information provision device 10, and the image information provision device 10 may perform map matching to identify the position on the map data corresponding to each piece of positioning information.

The camera 26 captures a captured-image of the area around the vehicle A (forward, backward, and the like, in the traveling direction). In the present embodiment, the camera 26 is, for example, a camera of the dashboard camera.

Next, the function of the processor 21 will be described. By operating according to predetermined programs, the processor 21 achieves functions as a condition acquisition unit 210, a determination unit 211, an image transmission processing unit 212, and a travel information transmission processing unit 213.

The condition acquisition unit 210 acquires a collection condition indicating a collection point or a collection section in a captured-image to be transmitted to the image information provision device 10.

The determination unit 211 determines whether the vehicle A is traveling on the target road based on the positioning information. The determination unit 211 determines whether the vehicle A has arrived at the collection point or collection section based on the positioning information.

In a case where it is determined that the vehicle A has arrived at the collection point or collection section, the image transmission processing unit 212 transmits a captured-image captured by the camera 26 to the image information provision device 10.

The travel information transmission processing unit 213 transmits, to the image information provision device 10, information indicating that the vehicle A is traveling on the target road.

State Transform of On-board Unit

Figure 4:
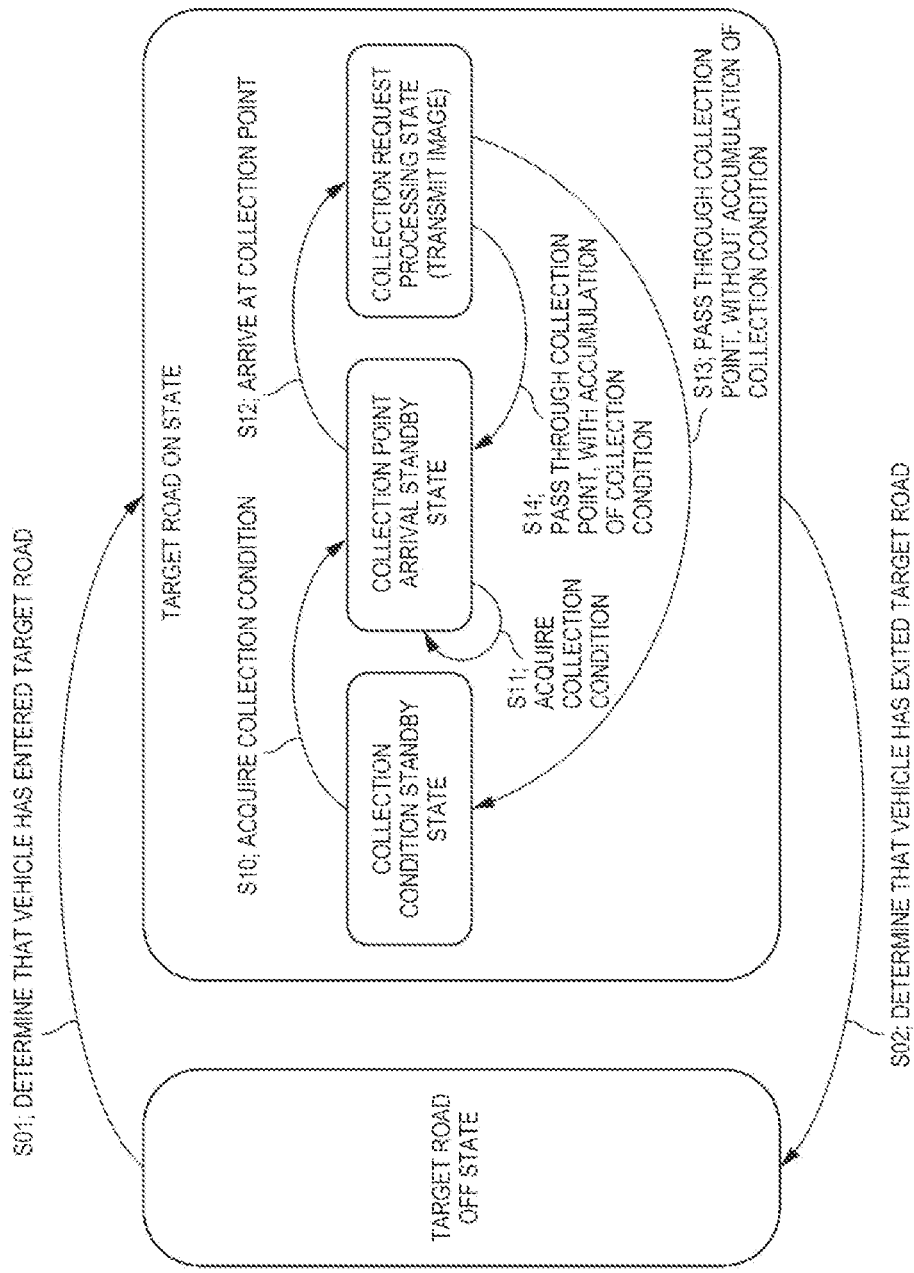
FIG. 4 is a diagram illustrating an example of state transform of the on-board unit according to the first embodiment of the disclosure.

FIG. 4 is a diagram illustrating an example of the state transform of the on-board unit according to the first embodiment of the disclosure.

As illustrated in FIG. 4, the on-board unit 20 has a plurality of states. The on-board unit 20 according to the present embodiment is first classified into two states being a "target road OFF state" and an "target road ON state". The target road OFF state is a state in which the vehicle A is not traveling on the target road. The on-board unit 20 does not transmit a captured-image when in the target road OFF state. The target road ON state indicates a state in which the vehicle A is traveling on the target road. When in the target road ON state, the on-board unit 20 receives a request from the image information provision device 10 and transmits a captured-image.

In a case where the state of the on-board unit 20 is the "target road OFF state", the determination unit 211 of the on-board unit 20 determines whether the vehicle A has entered the target road based on the positioning information generated by the positioning unit 25. Information indicating the position and range of each target road is recorded in advance in the storage 23 of the on-board unit 20. In a case where the position of the vehicle A is included in the range of the target road, the determination unit 211 determines that the vehicle A has entered the target road (step S01). In this case, the determination unit 211 switches the state of the on-board unit 20 to the "target road ON state". In a case where the on-board unit 20 is an ETC on-board unit, the determination unit 211 may communicate with a communication device (ETC antenna) provided at an entrance gate of the target road and detect that the vehicle has entered the target road. In a case where the positioning unit 25 identifies the position of the vehicle A on the map data by map matching, the determination unit 211 may detect that the vehicle A has entered the target road from another road based on the time series of a map matching result.

In a case where the state of the on-board unit 20 is the "target road ON state", the determination unit 211 of the on-board unit 20 determines whether the vehicle A has exited the target road based on the positioning information generated by the positioning unit 25. In a case where the position of the vehicle A is out of the range of the target road, the determination unit 211 determines that the vehicle A has exited from the target road (step S02). In this case, the determination unit 211 switches the state of the on-board unit 20 to the "target road OFF state". In a case where the on-board unit 20 is an ETC on-board unit, the determination unit 211 may communicate with a communication device (ETC antenna) provided at an exit gate of the target road to detect that the vehicle has exited the target road. In a case where the positioning unit 25 identifies the position of the vehicle A on the map data by map matching, the determination unit 211 may detect that the vehicle A has exited from the target road to another road based on the time series of a map matching result.

The "target road ON state" is further divided into three states being a "collection condition standby state", a "collection point arrival standby state", and a "collection request processing state".

The "collection condition standby state" is a state of standing by for a collection condition from the image information provision device 10. In this state, a captured-image is not transmitted. Upon acquiring a collection condition from the image information provision device 10 in this state (step S10), the condition acquisition unit 210 of the on-board unit 20 switches the state of the on-board unit 20 to the "collection point arrival standby state". Upon acquiring a plurality of collection conditions from the image information provision device 10, the condition acquisition unit 210 of the on-board unit 20 may sort and store the collection conditions in order of proximity of the collection points or collection sections to the vehicle.

The "collection point arrival standby state" is a state of waiting until the collection condition acquired from the image information provision device 10 is satisfied, that is, until the collection point or collection section is reached. In this state, the captured-image is not transmitted. Upon acquiring a collection condition from the image information provision device 10 in this state (step S11), the condition acquisition unit 210 of the on-board unit 20 maintains the state of the on-board unit 20 in the "collection point arrival standby state". In a case where the vehicle A arrives at the collection point or collection section (step S12), the determination unit 211 of the on-board unit 20 switches the state of the on-board unit 20 to the "collection request processing state".

The "collection request processing state" is a state in which the image transmission processing unit 212 of the on-board unit 20 transmits a captured-image to the image information provision device 10 based on the collection condition. In a case where the vehicle A passes through the collection point or collection section in this state and no other collection condition is accumulated (step S13), the determination unit 211 of the on-board unit 20 switches the state of the on-board unit 20 to the "collection condition standby state". In a case where the vehicle A passes through the collection point or collection section and another collection condition is accumulated (step S14), the determination unit 211 of the on-board unit 20 switches the state of the on-board unit 20 to the "collection point arrival standby state".

Processing Example of Image Information Provision System

Figure 5:
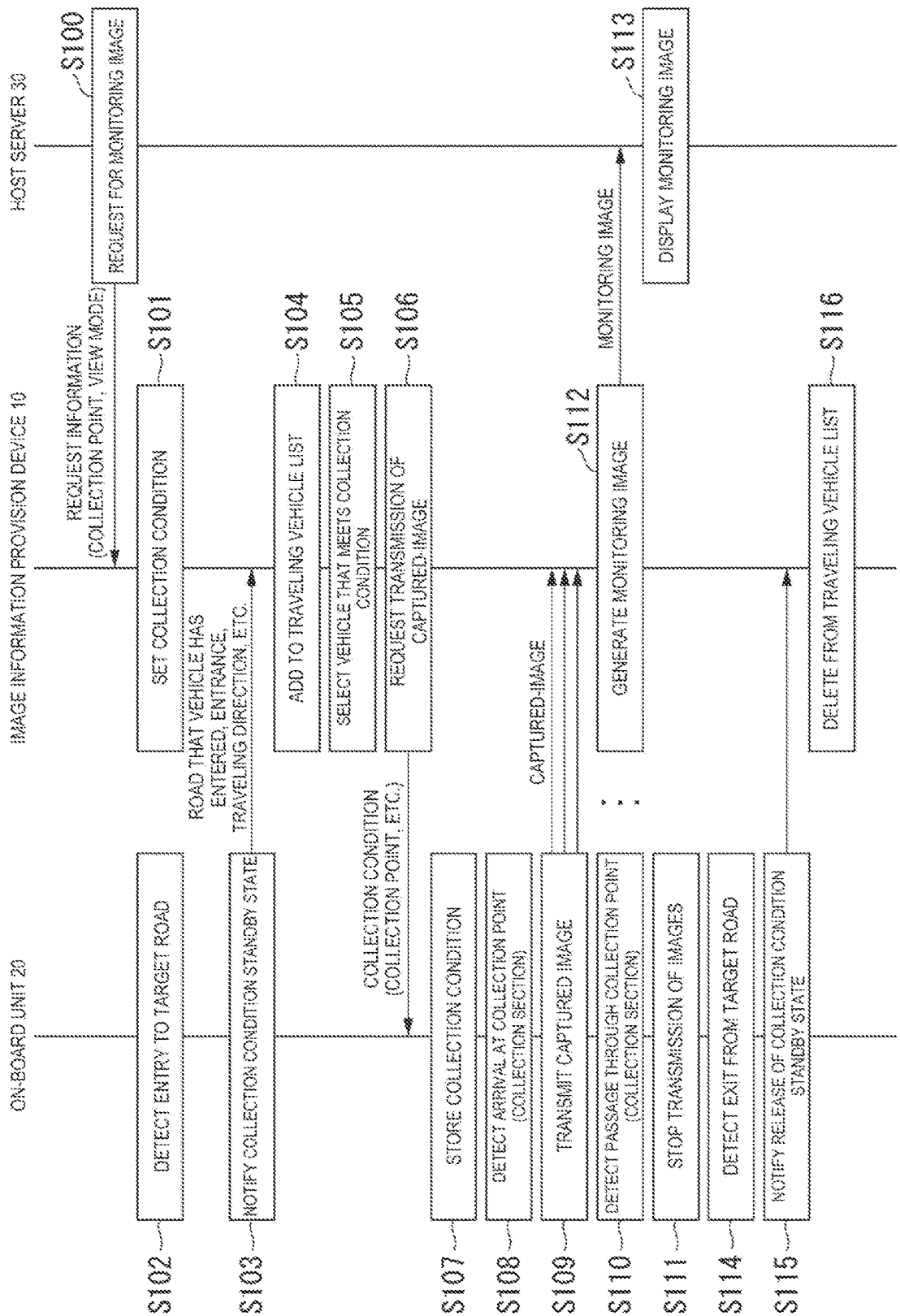
FIG. 5 is a diagram illustrating an example of processing of the image information provision system according to the first embodiment of the disclosure.

FIG. 5 is a diagram illustrating an example of the processing of the image information provision system according to the first embodiment of the disclosure.

Hereinafter, the flow of processing of providing a road monitoring image will be described with reference to FIG. 5. Here, a case will be described in which an inspector of a road operator designates a place to be monitored on the road, and the image information provision device 10 provides a monitoring image of the designated place.

First, the inspector of the road operator performs, on the host server 30, an operation to designate a point or a section to be monitored (for which an image is to be collected) on the target road and a view mode indicating the type of monitoring image.

Figure 6:
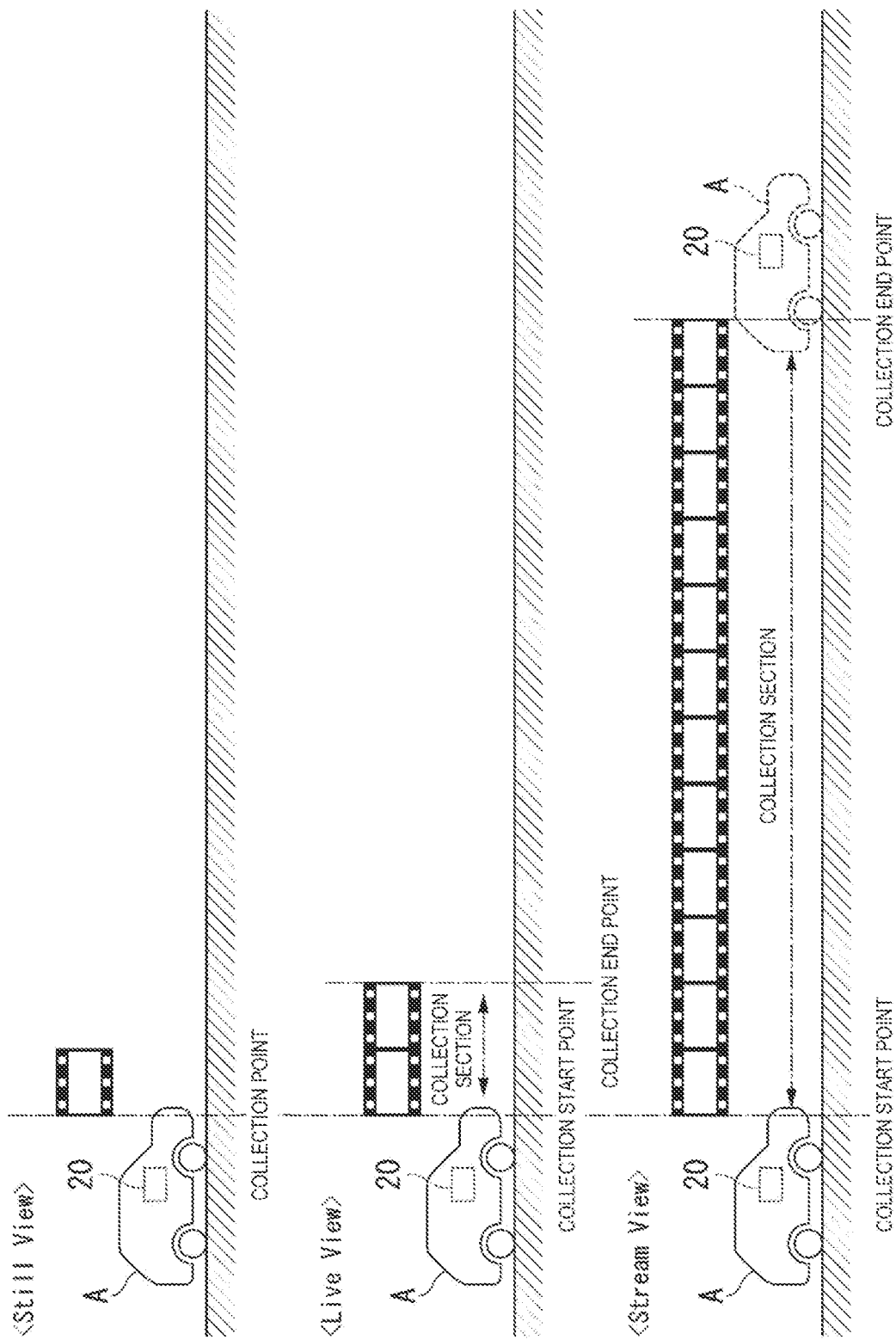
FIG. 6 is a first view illustrating an example of a view mode according to the first embodiment of the disclosure.

FIG. 6 is a first view illustrating an example of the view mode according to the first embodiment of the disclosure.

Examples of the view mode include "Still View", "Live View", and "Stream View" as illustrated in FIG. 6.

"Still View" is a mode for displaying, as a monitoring image, a still image captured by the on-board unit 20 at the collection point of the target road. This mode is used when the inspector wishes to confirm the state of a discretionary point.

"Live View" is a mode for displaying, as a monitoring video, a short-period moving image captured by the on-board unit 20 in a predetermined collection section of the target road. At a location with poor visibility such as a curve, it may be difficult to find out the situation beyond the curve in Still View in which the viewpoint is fixed. In this case, the state of such a road with poor visibility can be better known by acquiring a video from the start point to the end point of the curve in Live View.

"Stream View" is a mode for displaying, as a monitoring video, a moving image captured by the on-board unit 20 in a collection section longer than that in Live View. This mode is useful when wishing to monitor a section with a relatively long distance, such as from one entrance to the next entrance. Monitoring in the Stream View mode may be performed in a section in which high-speed large-capacity communication such as 5G is available, and monitoring in the Live View mode, in which the file size is smaller than that of Stream View, may be performed in a section in which high-speed large-capacity communication is not available.

In a case where the inspector wishes to perform monitoring only for a specific period, the inspector may further designate an image collection period. Then, the host server 30 generates request information including information input by the inspector and transmits the request information to the image information provision device 10 (step S100).

The setting unit 110 of the image information provision device 10 sets a collection condition for the captured-image based on the request information received from the host server 30, and records the collection condition in a collection condition list D1 (FIG. 7) (step S101).

FIG. 7 is a diagram illustrating an example of a collection condition list according to the first embodiment of the disclosure.

As illustrated in FIG. 7, the collection condition list D1 is a record of the target road and traveling direction, the collection point or collection section, the view mode, and the collection period.

The target road and traveling direction are information (e.g., a road ID) used to identify the road on which the captured-image is collected and the traveling direction (e.g., inbound lane and outbound lane).

The collection point indicates one point of the target road. The collection point is information used for requesting the on-board unit 20 to transmit an image (still image for Still View) captured at a timing when the vehicle A arrives at this point.

The collection section indicates a range (in the example of a collection condition 2 of FIG. 7, the section of "points X2 to X3" of a highway HW1) from one point to another point of the target road. The collection section is information used for requesting the on-board unit 20 to transmit an image (video for Live View or Stream View) captured during a period from when the vehicle A enters this section to when the vehicle A exits. The collection section may be designated in a range from one point to a point at which the vehicle has traveled for a certain period of time (in the example of a collection condition 3 of FIG. 7, a point at which the vehicle has traveled "for three minutes from the point X4" on a highway HW2).

The collection period indicates a period during which the captured-image is collected, and is information used for requesting the on-board unit 20 to transmit an image (still image or video) captured at a collection point or in a collection section in a case where the on-board unit 20 arrives at the collection point or collection section in this period. The collection period may be represented by a period from reception of the request information of the host server 30 to acquisition of as many captured-images as the designated number (for example, 10) of vehicles. In a case where the collection period is not designated (blank), collection of the captured-images and generation of the monitoring images may be continuously performed until a notification to cancel the request is received from the host server 30.

Upon detecting that the vehicle A has entered the target road (step S102), the determination unit 211 of the on-board unit 20 sets the state of the on-board unit 20 to the "target road ON state" and the "collection condition standby state". The travel information transmission processing unit 213 of the on-board unit 20 notifies the image information provision device 10 that the on-board unit 20 has changed to the "collection condition standby state", that is, that reception of a transmission request for the captured-image has become possible (step S103). At this time, the travel information transmission processing unit 213 also notifies information including identification information (road ID) used to identify a target road that the vehicle A has entered, identification information (on-board unit ID) used to identify the on-board unit 20, a point at which the vehicle A has entered the target road (entrance ID of the highway), and a traveling direction (e.g., inbound lane or outbound lane).

Figure 8:
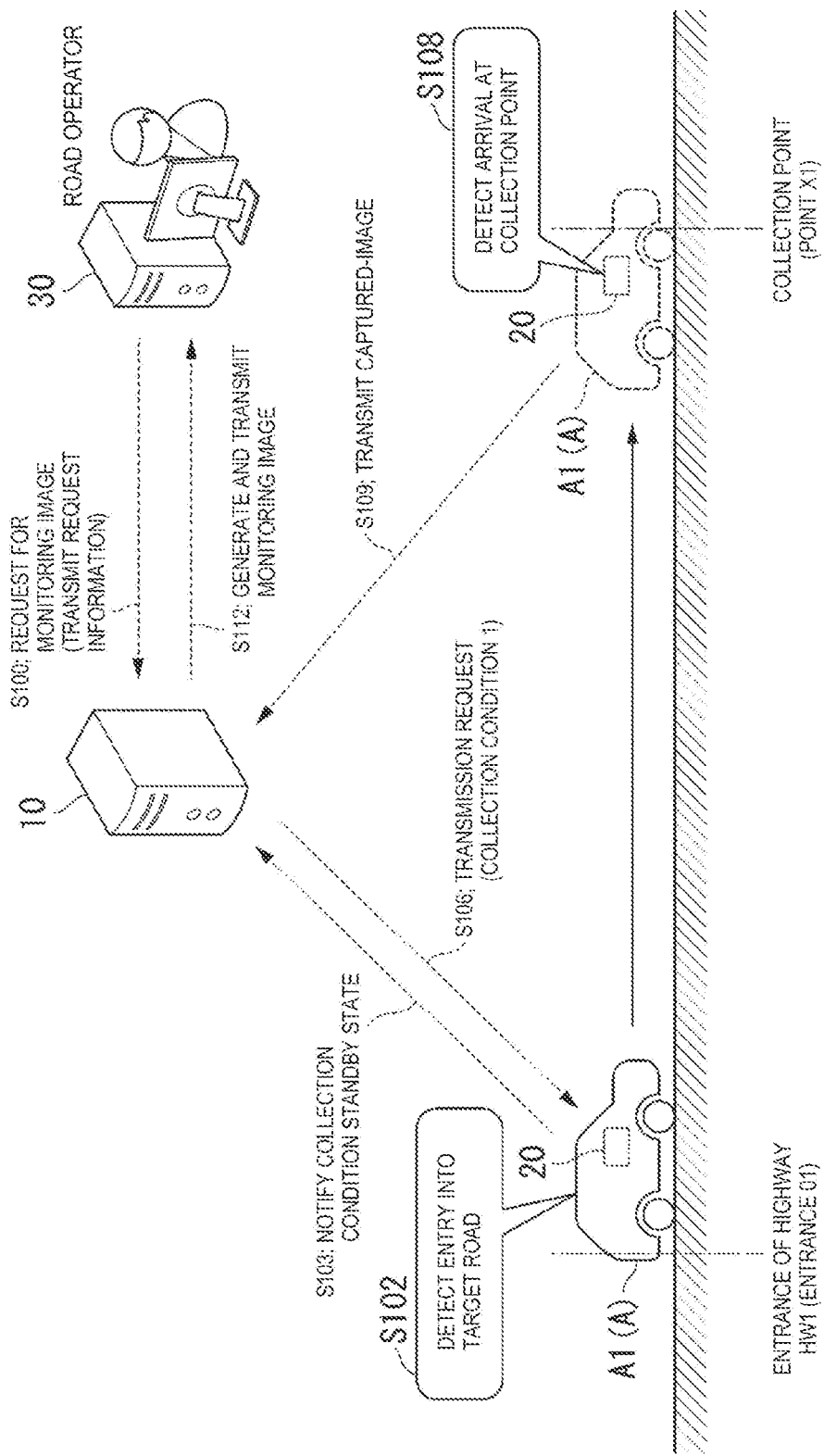
FIG. 8 is a first view illustrating a function of the image information provision system according to the first embodiment of the disclosure.

FIG. 8 is a first diagram illustrating the function of the image information provision system according to the first embodiment of the disclosure.

FIG. 8 illustrates an example (example of a collection condition 1 in FIG. 7) in which the image information provision device 10 acquires a captured-image (still image) for Still View from the on-board unit 20 of a vehicle A1 that has arrived at a collection point (point X1). As illustrated in FIG. 8, it is assumed that the vehicle A1 has entered the highway HW1 (inbound lane), which is a target road, from an entrance 01. At this time, the on-board unit 20 of the vehicle A1 notifies the image information provision device 10 that the on-board unit 20 has entered the collection condition standby state, together with information indicating the road that the vehicle has entered, the entrance, the traveling direction, the entry date and time, and the like (step S103).

Then, the travel information acquisition unit 113 of the image information provision device 10 adds, to a traveling vehicle list D2 (FIG. 9), the information on a vehicle A3 (on-board unit 20) that issued a notification upon entering the "collection condition standby state" (step S104).

FIG. 9 is a diagram illustrating an example of a traveling vehicle list according to the first embodiment of the disclosure.

As illustrated in FIG. 9, the traveling vehicle list D2 is a record, for each target road, of identification information (on-board unit ID) of the vehicle that has entered the target road, the location where the vehicle entered the target road (entrance ID of the highway), a traveling direction (e.g., inbound lane and outbound lane), and an entry date and time.

In the example of FIG. 8, the vehicle A1 enters the highway HW1 from the entrance 01. In this case, as illustrated in FIG. 9, based on the notification from the on-board unit 20 of the vehicle A1, the travel information acquisition unit 113 adds the on-board unit ID ("A1") of the vehicle A1, the entry point ("entrance 02") to the highway HW1, the entry direction ("inbound lane"), and the entry date and time to the traveling vehicle list D2 corresponding to the highway HW1 (step S104).

Next, based on the collection condition list D1 and the traveling vehicle list D2, the image acquisition unit 111 of the image information provision device 10 selects a vehicle (target vehicle) meeting each collection condition (step S105). Here, the image acquisition unit 111 selects, as the target vehicle, a vehicle within a predetermined range from the collection point or collection section indicated in the collection condition. Specifically, the image acquisition unit 111 determines that a vehicle that has entered from the closest entrance on an upstream side of the collection point or collection section is a vehicle that meets this collection condition.

An example of selecting the target vehicle of the collection condition 1 in FIG. 7 will be described. The collection condition 1 in FIG. 7 is to collect a captured-image captured at a "point X1" located on a downstream side (forward in the traveling direction) of the entrance 01 on the highway HW1 (inbound lane). At this time, with reference to the traveling vehicle list D2 (FIG. 9), the image acquisition unit 111 selects, as the target vehicle of the collection condition 1, the vehicle A1 that has entered the highway HW1 from the closest entrance 01 on the upstream side of the point X1 (step S105).

In a case where there is another vehicle that meets the collection condition 1, the image acquisition unit 111 may select a plurality of target vehicles. Furthermore, the image acquisition unit 111 may exclude a vehicle whose entry date and time is in the past for equal to or greater than a predetermined time (for example, 1 hour). The predetermined time may be changed according to the distance from the entrance to the collection point.

Next, the image acquisition unit 111 transmits a signal requesting the on-board unit 20 of the vehicle A1 selected as the target vehicle to transmit the captured-image indicated in the collection condition 1 (step S106).

Then, in the vehicle A1, the condition acquisition unit 210 of the on-board unit 20 stores, in the storage 23, the collection condition 1 acquired from the image information provision device 10 (step S107), and switches the state of the on-board unit 20 to the "collection point arrival standby state".

When in the "collection point arrival standby state", the determination unit 211 of the on-board unit 20 sequentially determines whether the vehicle A1 has arrived at the collection point (point X1) indicated in the collection condition 1 based on the positioning information of the positioning unit 25. Upon detecting that the vehicle A1 has arrived at the collection point (step S108), the determination unit 211 switches the state of the on-board unit 20 to the "collection request processing state". When the state of the on-board unit 20 is the "collection request processing state", the image transmission processing unit 212 transmits, to the image information provision device 10, the captured-image (still image) captured based on the collection condition 1 (step S109). Upon detecting that the vehicle A1 has passed through the collection point (step S110), the determination unit 211 switches the state of the on-board unit 20 to the "collection point arrival standby state" or the "collection condition standby state" depending on whether another collection condition has been stored.

Figure 10:
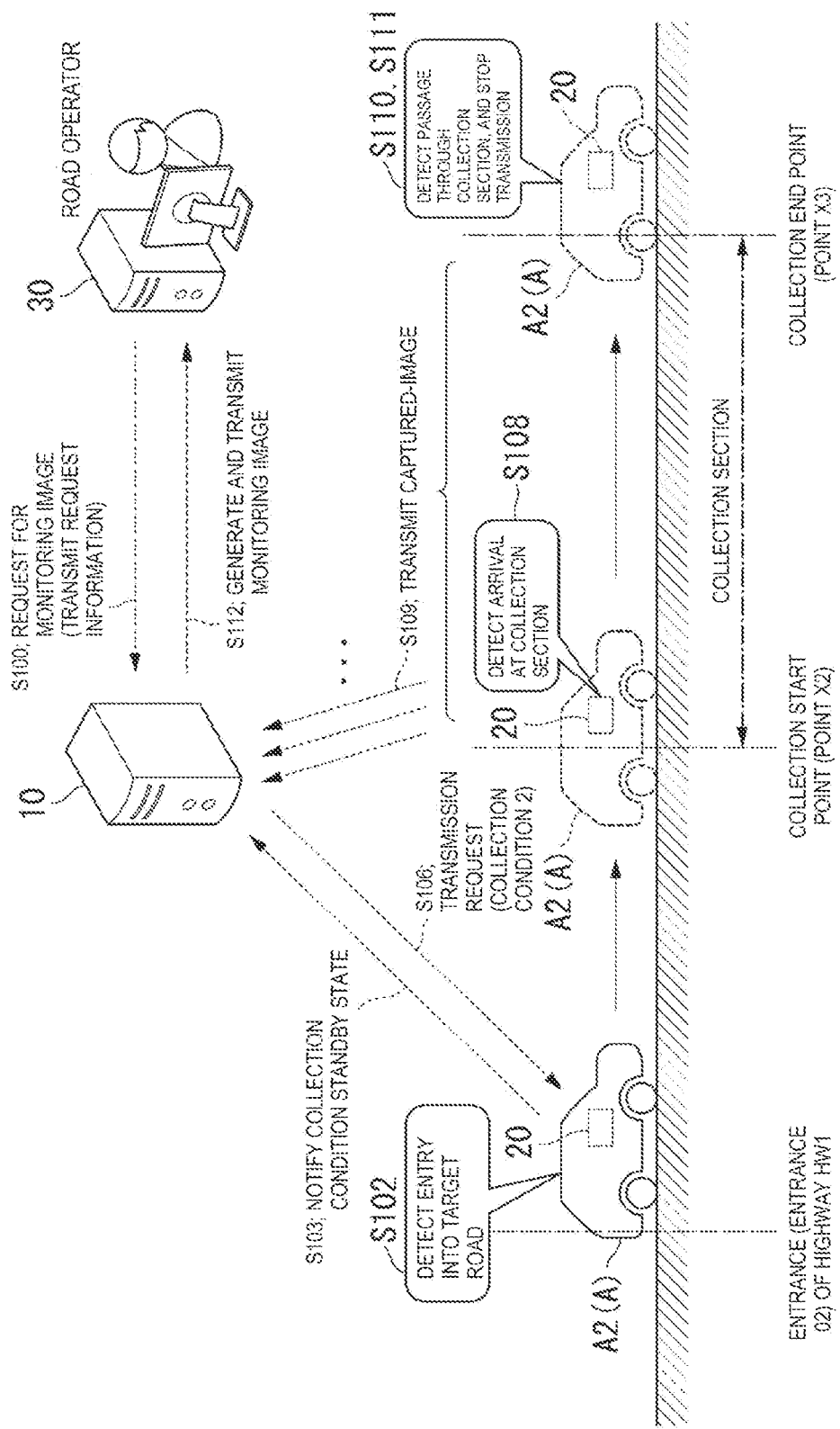
FIG. 10 is a second view illustrating a function of the image information provision system according to the first embodiment of the disclosure.

FIG. 10 is a second diagram illustrating the function of an image information provision system according to the first embodiment of the disclosure.

FIG. 10 illustrates an example (example of the collection condition 2 in FIG. 7) in which the image information provision device 10 acquires a captured-image (moving image) for Live View from the on-board unit 20 of a vehicle A2 that is traveling in the collection section (points X2 to X3). As illustrated in FIG. 10, it is assumed that the vehicle A2 has entered the highway HW1 (inbound lane), which is a target road, from the entrance 02. At this time, the on-board unit 20 of the vehicle A2 notifies the image information provision device 10 that the on-board unit 20 has entered the collection condition standby state, together with information indicating the road that the vehicle entered, the entrance, and the traveling direction (step S103).

An example of selecting the target vehicle of the collection condition 2 in FIG. 7 will be described. The collection condition 2 in FIG. 7 is to collect a captured-image captured in a "collection section from the points X2 to X3" located on a downstream side (forward in the traveling direction) of the entrance 02 on the highway HW1 (inbound lane). At this time, with reference to the traveling vehicle list D2 (FIG. 9), the image acquisition unit 111 selects, as the target vehicle of the collection condition 2, the vehicle A2 that has entered the highway HW1 from the closest entrance 02 on the upstream side of the start point (point X2) of the collection section (step S105).

Next, the image acquisition unit 111 transmits a signal requesting the on-board unit 20 of the vehicle A2 selected as the target vehicle to transmit the captured-image indicated in the collection condition 2 (step S106).

Then, in the vehicle A2, the condition acquisition unit 210 of the on-board unit 20 stores, in the storage 23, the collection condition 2 acquired from the image information provision device 10 (step S107), and switches the state of the on-board unit 20 to the "collection point arrival standby state".

When in the "collection point arrival standby state", the determination unit 211 of the on-board unit 20 sequentially determines whether the vehicle A2 has arrived at the start point (point X2) of the collection section indicated in the collection condition 2 based on the positioning information of the positioning unit 25. Upon detecting that the vehicle A2 has arrived at the start point of the collection section (step S108), the determination unit 211 switches the state of the on-board unit 20 to the "collection request processing state". When the state of the on-board unit 20 is the "collection request processing state", the image transmission processing unit 212 sequentially transmits, to the image information provision device 10, the captured-image (video) captured based on the collection condition 2 (step S109). Upon detecting that the vehicle A1 has passed through the collection point (step S110), the determination unit 211 switches the state of the on-board unit 20 to the "collection point arrival standby state" or the "collection condition standby state" depending on whether another collection condition has been stored. When the state of the on-board unit 20 is no longer the "collection request processing state", the image transmission processing unit 212 stops transmission of the captured-image (step S111).

Next, based on the image acquired from the on-board unit 20, the image generation unit 112 of the image information provision device 10 generates and transmits a monitoring image to the host server 30 (step S112). At this time, the image generation unit 112 may generate a monitoring image to which image processing of hiding privacy information (e.g., vehicle license plate and face of a person in the vehicle) is added. Then, the host server 30 displays the monitoring image received from the image information provision device 10 (step S113). The inspector confirms the state of the target road with reference to the monitoring image.

Upon detecting that the vehicle A2 has exited the target road (step S114), the determination unit 211 of the on-board unit 20 sets the state of the on-board unit 20 to the "target road OFF state". The travel information transmission processing unit 213 of the on-board unit 20 notifies the image information provision device 10 that the "collection condition standby state" of the on-board unit 20 has been released (step S115).

Then, the travel information acquisition unit 113 of the image information provision device 10 deletes, from the traveling vehicle list D2 (FIG. 9), the information on the vehicle A2 that notified the release of the "collection condition standby state" (step S116).

In step S112 of FIG. 5, the image generation unit 112 of the image information provision device 10 may generate a monitoring image in which captured-images collected from a plurality of on-board units 20 are combined.

Figure 11:
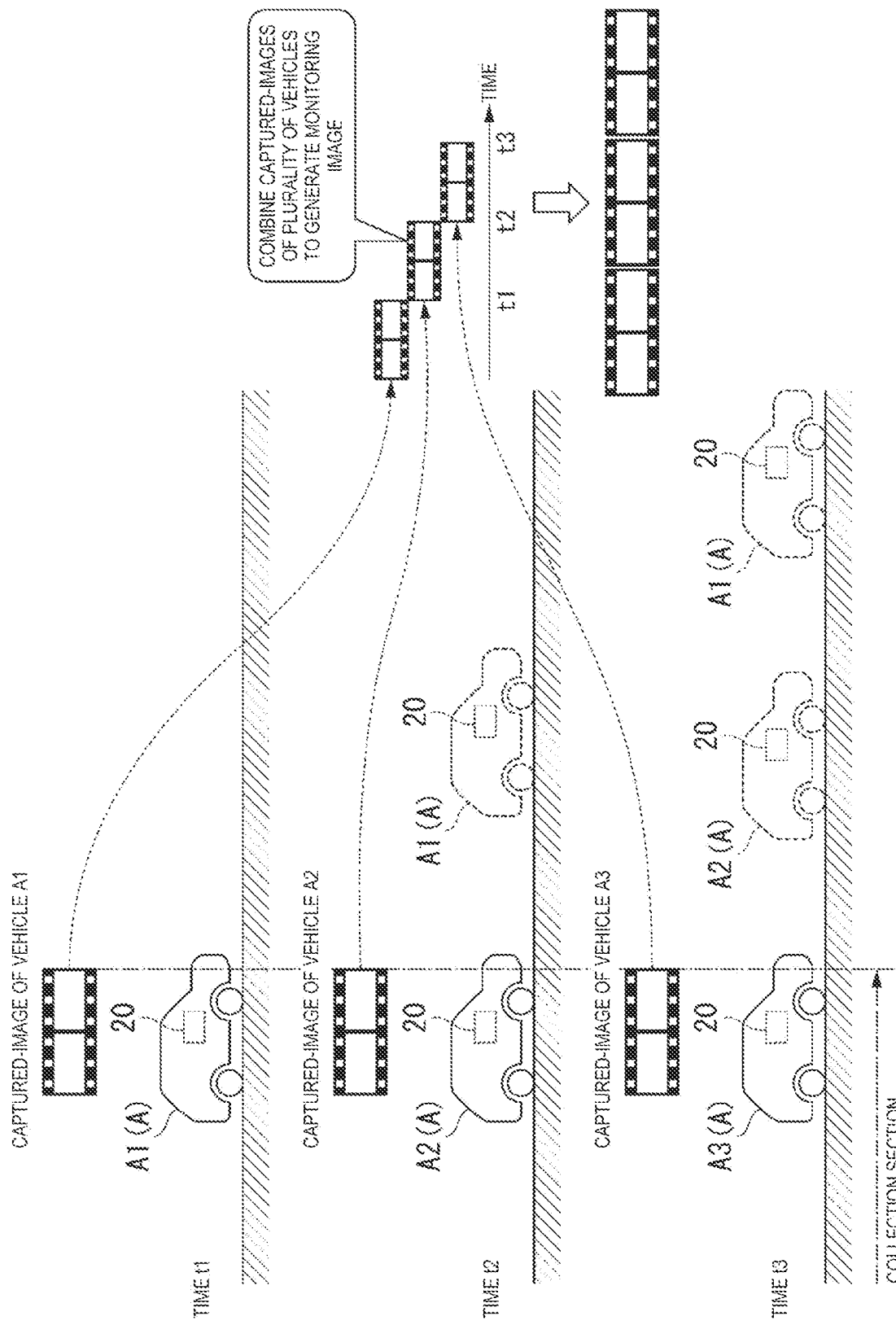
FIG. 11 is a second view illustrating an example of the view mode according to the first embodiment of the disclosure.

FIG. 11 is a second view illustrating an example of the view mode according to the first embodiment of the disclosure.

FIG. 11 illustrates an example in which the image generation unit 112 generates a monitoring image for the Live View mode. As illustrated in FIG. 11, it is assumed that the vehicle A1, the vehicle A2, and the vehicle A3 have sequentially passed through the collection section at a time t1, a time t2, and a time t3. The image generation unit 112 generates monitoring images (video) in which the captured-images (video) captured by the vehicle A1 in the collection section by the time t1, the captured-images captured by the vehicle A2 in the collection section by the time t2, and the captured-images captured by the vehicle A3 in the collection section by the time t3 are arranged in time series and combined into one video. By doing so, the image generation unit 112 can generate a pseudo video as if the video were continuously captured by a fixed camera for a certain collection section.

For example, it is assumed that the inter-vehicular distance between the vehicle A1 and the vehicle A2 is large and there is a time (blank time has occurred) from when the vehicle A1 passed through the collection section to when the vehicle A2 entered the collection section. In this case, for this blank time, the image generation unit 112 may generate a video in which the last frame of the video of the vehicle A1 is stopped and then, upon acquiring the video of the vehicle A2, combine a video of the vehicle A2 following this still video.

Operational Effects

As described above, the image information provision device 10 according to the present embodiment requests the on-board unit 20 of the vehicle A within a predetermined range from the collection point or collection section indicated in the collection condition to transmit a captured-image captured at the collection point or in the collection section, and generates a monitoring image of the collection point or collection section based on the captured-image received from the on-board unit 20 that has received the request.

With this configuration, the image information provision device 10 can also generate a monitoring image from an image captured by the on-board unit 20 of the vehicle A for a point or a section where a fixed camera is not installed on the target road such as a highway. The image information provision device 10 collects a captured-image from the on-board unit 20 only at a set collection point or in a set collection section of the target road. This makes it possible to reduce communication load between the image information provision device 10 and the on-board unit 20.

The image information provision device 10 sets a point or a section designated by the inspector via the host server 30 as a collection point or a collection section.

With this configuration, the image information provision device 10 can provide monitoring images of various places designated by the inspector without being limited to only fixed points or sections of the target road.

The image information provision device 10 sets, as a collection section, a section from a collection start point to a collection end on the target road, or a section from the collection start point to a point at which the vehicle A has traveled for a predetermined time.

With this configuration, the image information provision device 10 can flexibly set the length of the section that can be monitored in the monitoring image.

The image information provision device 10 generates, as a monitoring image, a video in which captured-images received from the plurality of on-board units 20 are connected in time series.

With this configuration, the image information provision device 10 can generate a pseudo video as if it were continuously captured by a fixed camera for the set collection section.

Upon arriving at the collection point or collection section indicated by the collection condition acquired from the image information provision device 10, the on-board unit 20 according to the present embodiment transmits the captured-images captured by the camera 26 to the image information provision device 10.

With this configuration, the on-board unit 20 only needs to transmit the captured-images to the image information provision device 10 at the designated point or section, and therefore communication load with the image information provision device 10 can be reduced.

Second Embodiment

Next, an image information provision system according to the second embodiment of the disclosure will be described with reference to FIG. 12.

The same components as those of the first embodiment will be denoted by the same reference signs, and a detailed description thereof will be omitted.

Figure 12:
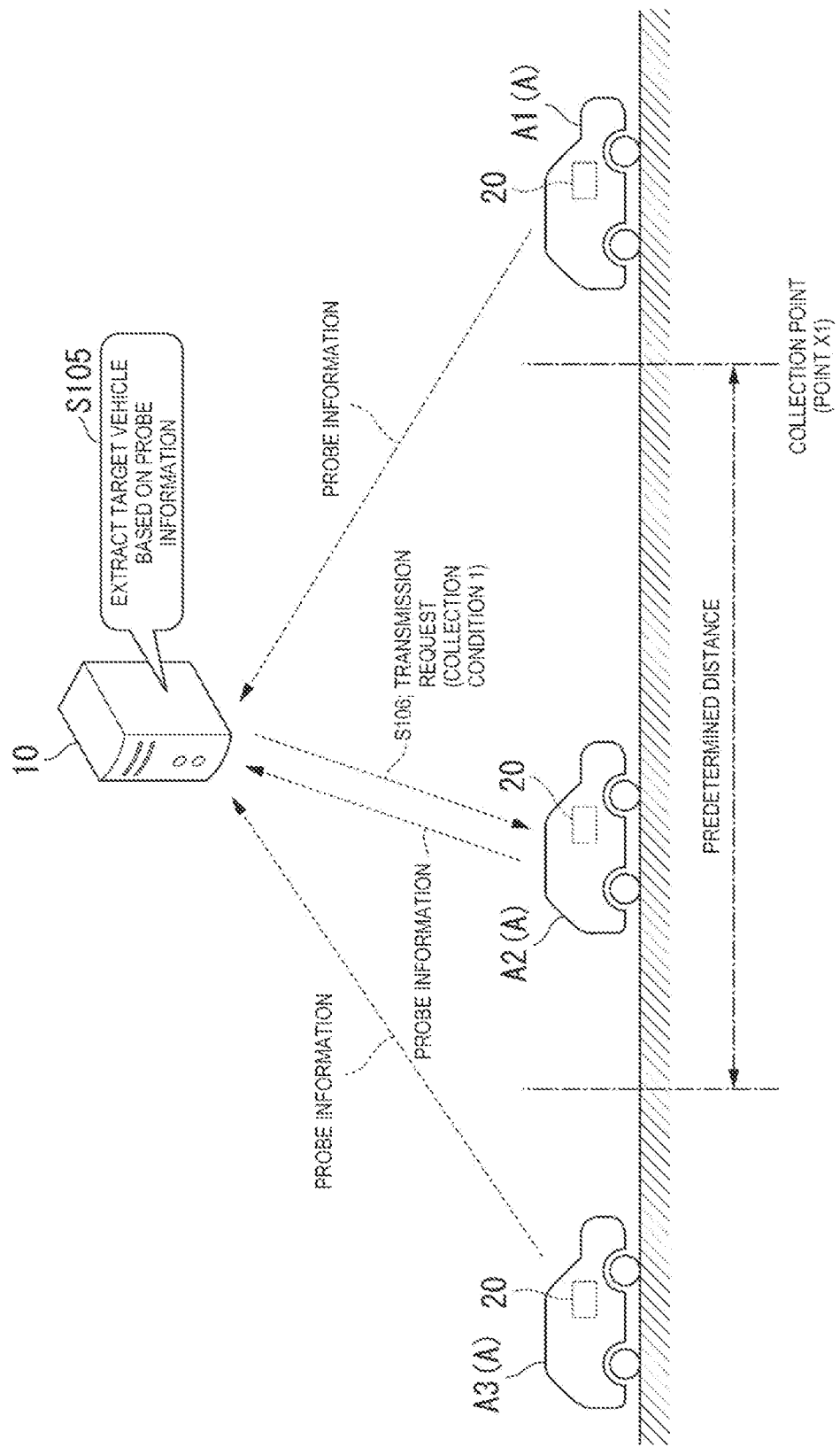
FIG. 12 is a diagram illustrating a function of an image information provision system according to a second embodiment of the disclosure.

FIG. 12 is a diagram illustrating the function of the image information provision system according to the second embodiment of the disclosure.

As illustrated in FIG. 12, the travel information transmission processing unit 213 of the on-board unit 20 according to the present embodiment transmits probe information including positioning information of the vehicle A (position, speed, and the like of the vehicle A) to the image information provision device 10 at a constant frequency.

The travel information acquisition unit 113 of the image information provision device 10 according to the present embodiment acquires probe information including the position of the vehicle A from the on-board unit 20.

The image acquisition unit 111 of the image information provision device 10 selects the target vehicle based on the probe information in the step (step S105 in FIG. 5) of selecting the target vehicle that meets the collection condition. Specifically, as illustrated in FIG. 12, the image acquisition unit 111 specifies and selects, as a target vehicle, a vehicle located within a predetermined distance (e.g., 10 km) on the upstream side from the collection point or collection section (step S105). In the example of FIG. 12, the image acquisition unit 111 first extracts the vehicle A1, the vehicle A2, and the vehicle A3 that are traveling on the target road from the traveling vehicle list D2 (FIG. 9). The probe information of these vehicles indicates that the vehicle A1 has already passed the collection point (point X1), and that the vehicle A2 is located at a position farther than the predetermined distance on the upstream side of the collection point. The probe information also indicates that the vehicle A2 is located within a predetermined distance on the upstream side of the collection point. In this case, the image acquisition unit 111 selects only the vehicle A2 as the target vehicle, and transmits a signal requesting the on-board units 20 of all the vehicles to transmit a captured-image (step S106).

With this configuration, based on the position of each vehicle indicated in the probe information, the image information provision device 10 can appropriately exclude, from the target vehicle, a vehicle that takes time to arrive at the collection point or collection section or a vehicle that has already passed through the collection point or collection section. This allows the image information provision device 10 to more reliably acquire the captured-image of the collection point or collection section.

The travel information acquisition unit 113 of the image information provision device 10 may perform map matching using the probe information received from the on-board unit 20 of the vehicle A and the map data stored in advance in the storage 13 to specify the position of the vehicle A on the map data corresponding to each probe information. In this case, upon detecting that the vehicle A has entered the target road from another road based on the time series of the map matching result, the travel information acquisition unit 113 transmits a signal notifying the on-board unit 20 that the vehicle A entered the target road. Upon detecting that the vehicle A has exited from the target road to another road based on the time series of the map matching result, the travel information acquisition unit 113 transmits a signal notifying the on-board unit 20 that the vehicle A exited from the target road. Upon receiving the notification of target road entry from the image information provision device 10, the determination unit 211 of the on-board unit 20 determines that the vehicle A has entered the target road in step S01 of FIG. 4 and step S102 of FIG. 5. Upon receiving the notification of target road exit from the image information provision device 10, the determination unit 211 determines that the vehicle A has exited the target road in step S02 of FIG. 4 and step S114 of FIG. 5.

Third Embodiment

Next, an image information provision system according to a third embodiment of the disclosure will be described with reference to FIGS. 13 and 14.

In the third embodiment, a function of automatically setting a collection condition is further added to the image information provision device 10 according to the second embodiment.

Figure 13:
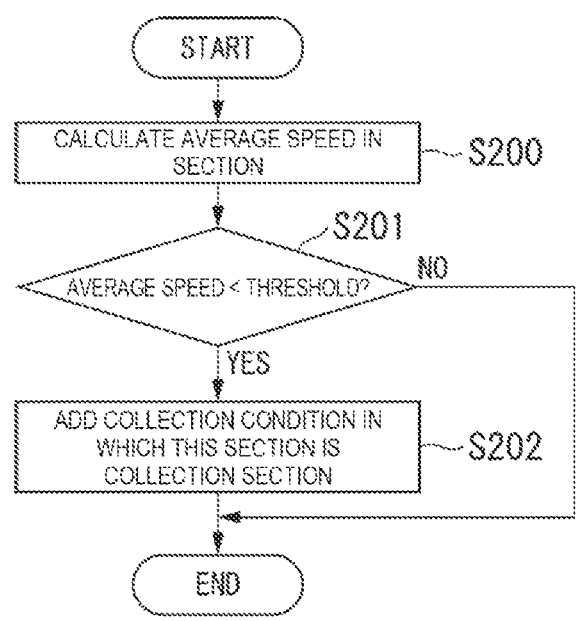
FIG. 13 is a flowchart showing an example of processing of the image information provision system according to a third embodiment of the disclosure.

FIG. 13 is a flowchart showing an example of the processing of an image information provision system according to the third embodiment of the disclosure.

In addition to step S101 of FIG. 5, the setting unit 110 of the image information provision device 10 according to the present embodiment further executes processing of automatically setting and adding a collection condition (collection section) (FIG. 13). Here, the setting unit 110 executes the series of processing shown in FIG. 13 for each of a plurality of sections in which the target road is divided for a certain distance or the like.

Based on the vehicle speeds included in the probe information collected from the plurality of on-board units 20, the average speed of the sections of the target road is calculated at regular time intervals (for example, 5 minutes) (step S200).

Next, the setting unit 110 determines whether the calculated average speed has fallen below a predetermined threshold (step S201). In a case where the average speed is equal to or greater than the threshold (step S201; NO), the setting unit 110 determines that the traffic flow in this section is smooth and there is no need for monitoring, and ends the processing. On the other hand, in a case where the average speed is less than the threshold (for example, 60 km/h) (step S201: YES), the setting unit 110 determines that the traffic flow in this section is stagnant and needs to be monitored. In this case, the setting unit 110 adds a collection condition having this section as the collection section to the collection condition list D1 (FIG. 7) (step S202). Note that the threshold is set in advance for each target road. When a new collection condition is added, the view mode is set to a predetermined mode (e.g., the Live View mode). The inspector may discretionarily change the threshold and the view mode for each target road via the host server 30.

Figure 14:
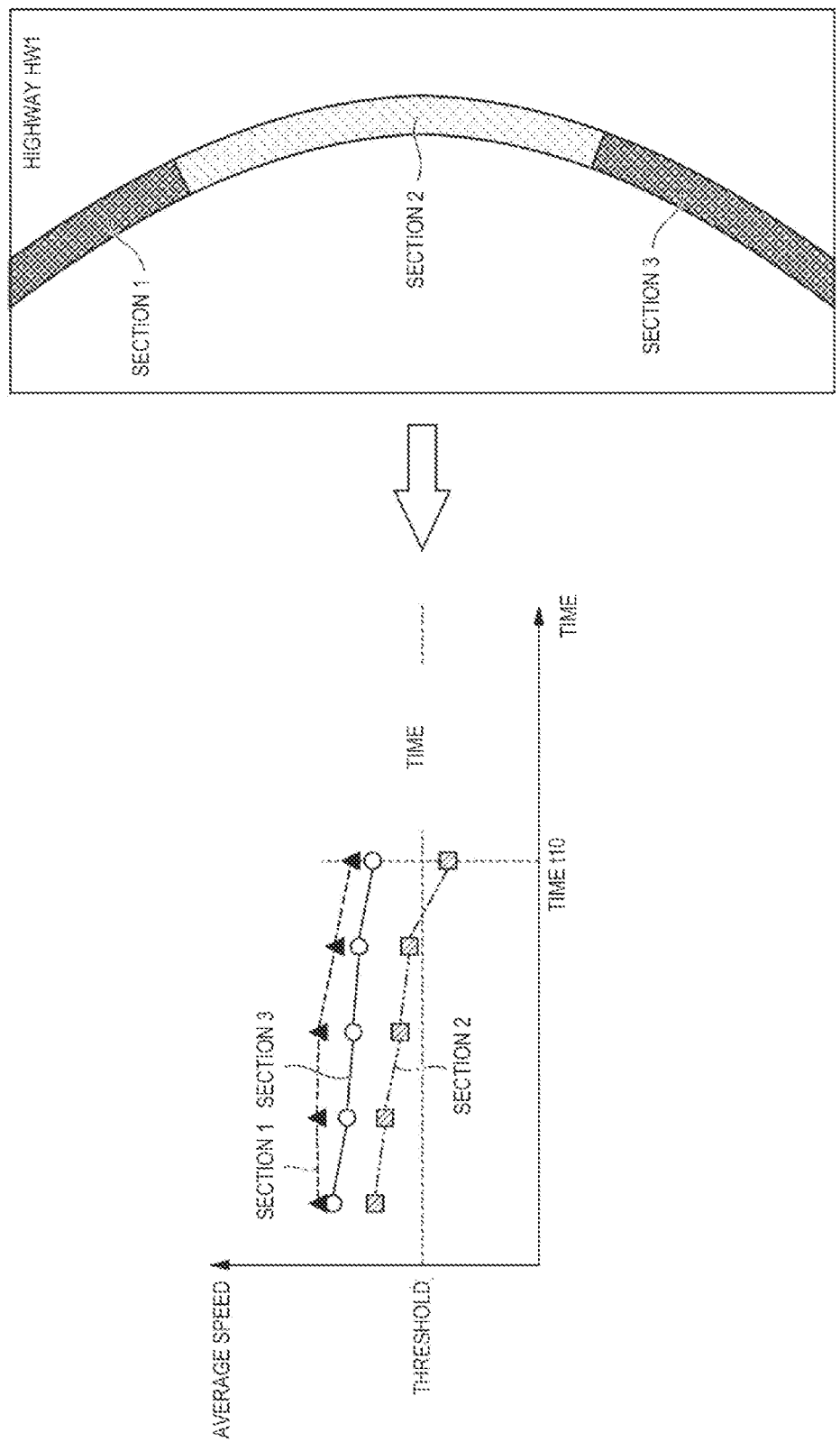
FIG. 14 is a diagram illustrating a function of an image information provision system according to the third embodiment of the disclosure.

FIG. 14 is a diagram illustrating the function of the image information provision system according to the third embodiment of the disclosure.

For example, it is assumed that the highway HW1, which is the target road, is divided into three sections being a section 1, a section 2, and a section 3. At this time, the setting unit 110 executes the series in processing of FIG. 13 for each of the sections 1 to 3. In the example of FIG. 14, at a certain time t10, the average speeds in the section 1 and the section 3 are equal to or greater than the threshold, but the average speed in the section 2 is less than the threshold. In this case, the setting unit 110 newly sets and adds, to the collection condition list D1 (FIG. 7), a collection condition with the section 2 of the highway HW1 as a collection section (step S202).

With this configuration, the image information provision device 10 can automatically set, as a collection section, a section in which the traffic flow is stagnant (there is a sign of a traffic jam), and generate a monitoring image. By transmitting the automatically generated monitoring image to the host server 30 and causing the inspector to confirm the monitoring image, it is possible to quickly find an event (e.g., road debris, accident, bad weather) that causes traffic stagnation.

Fourth Embodiment

Next, an image information provision system according to a fourth embodiment of the disclosure will be described with reference to FIGS. 15 and 16.

The same components as those of the first to third embodiments will be denoted by the same reference signs, and a detailed description thereof will be omitted.

Figure 15:
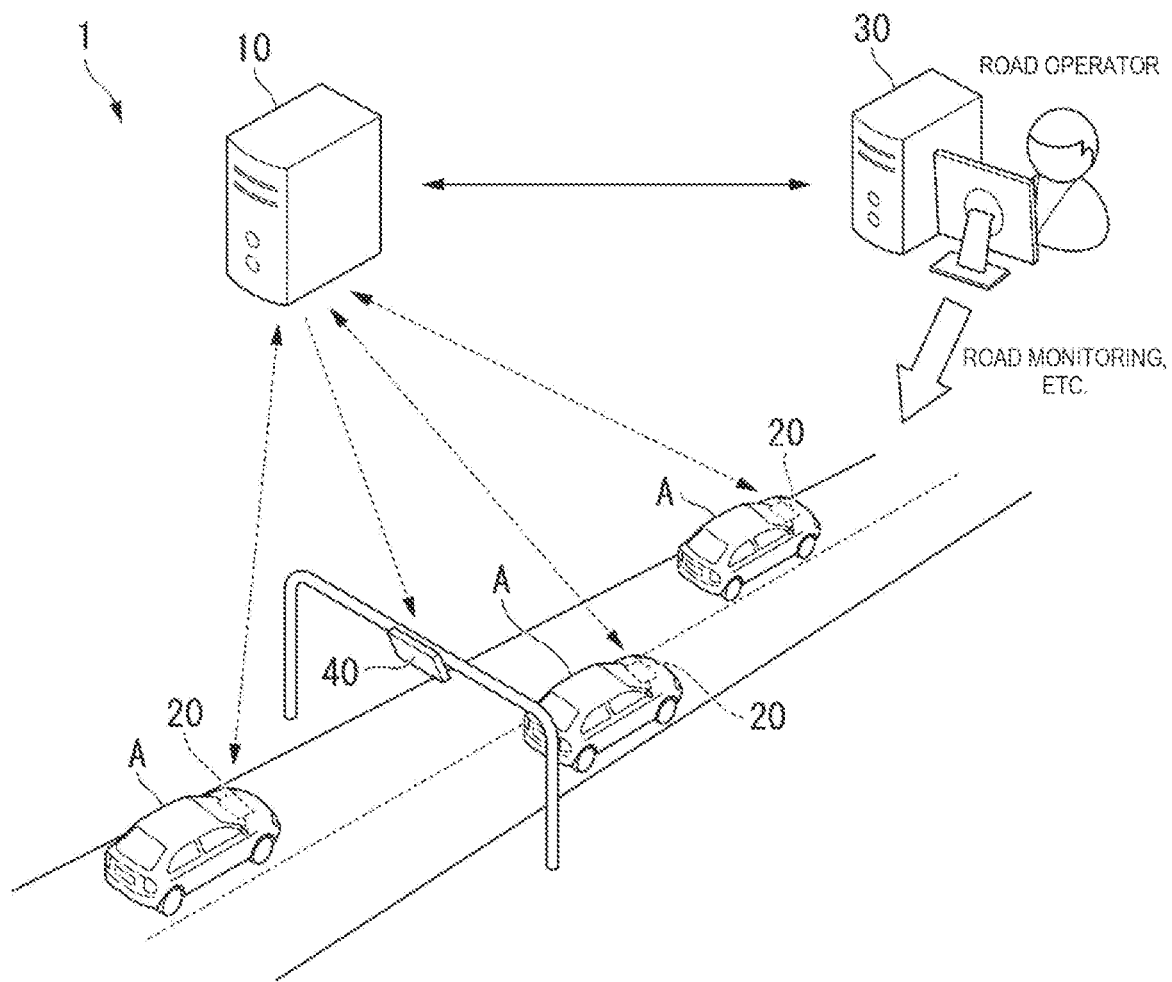
FIG. 15 is a diagram illustrating an overall configuration of an image information provision system according to a fourth embodiment of the disclosure.

FIG. 15 is a diagram illustrating the overall configuration of the image information provision system according to the fourth embodiment of the disclosure.

Figure 16:
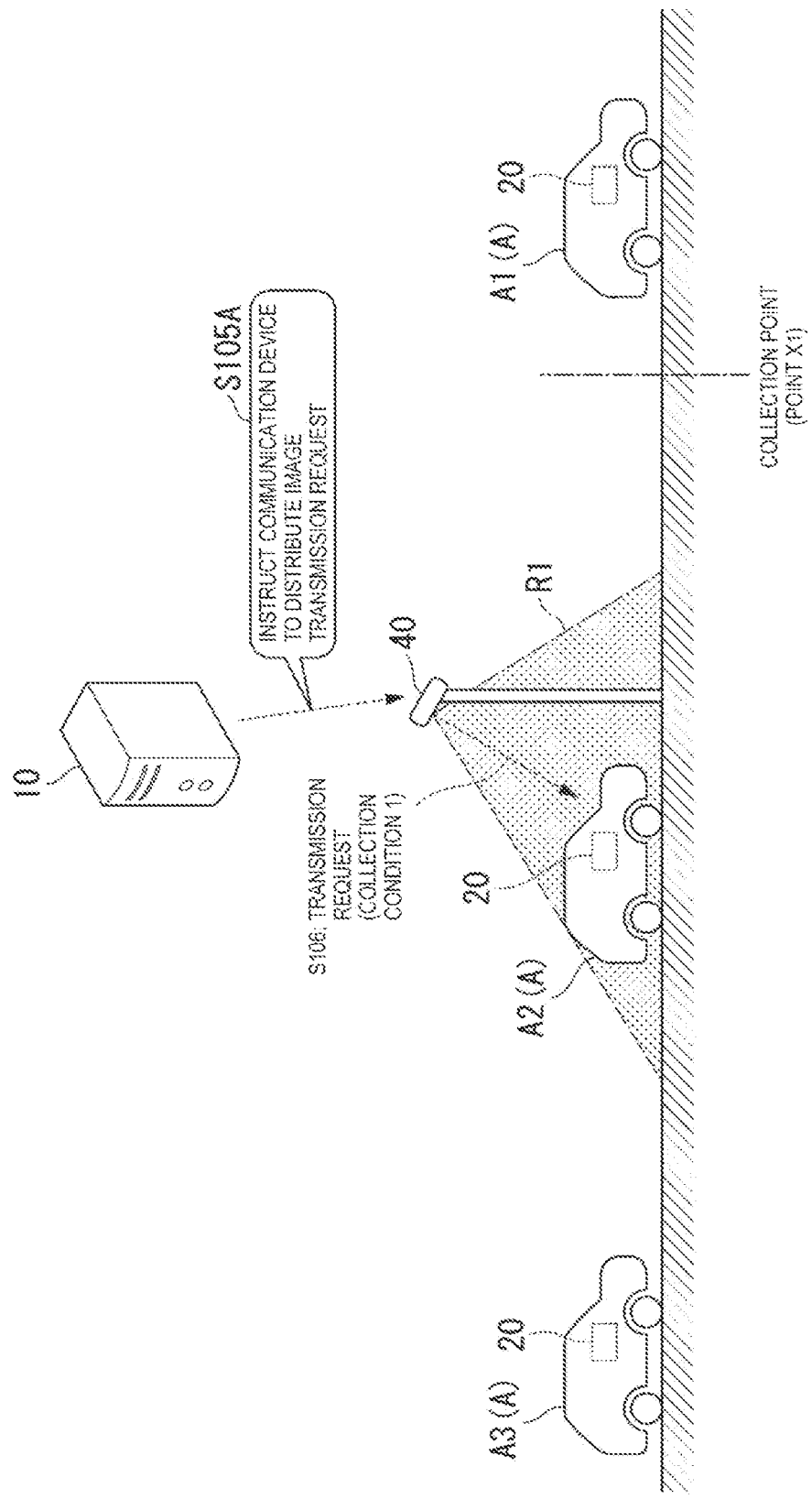
FIG. 16 is a diagram illustrating a function of an image information provision system according to the fourth embodiment of the disclosure.

FIG. 16 is a diagram illustrating the function of the image information provision system according to the fourth embodiment of the disclosure.

As illustrated in FIGS. 15 and 16, the image information provision system 1 according to the present embodiment further includes a communication device 40.

The communication device 40 is installed at a predetermined position on an upstream side from the collection point or collection section of the target road. The communication device 40 performs transmission/reception of various types of information with the on-board unit 20 of the vehicle A located in a communication region R1 via wireless communication.

The image acquisition unit 111 of the image information provision device 10 according to the present embodiment executes step S105A illustrated in FIG. 14 in place of step S105 in FIG. 5. Specifically, the image acquisition unit 111 instructs the communication device 40 installed on the upstream side of the desired collection point or collection section to distribute a signal indicating the collection condition and a transmission request for a captured-image to the on-board unit 20 of the vehicle passing through the communication region R1 (step S105A). Note that the information indicating the installation position of the communication device 40 is stored in advance in the storage 13 of the image information provision device 10, and the image acquisition unit 111 selects the communication device 40 close to the collection point or collection section based on this information and issues an instruction.

Then, the communication device 40 periodically distributes the collection condition and the transmission request toward the communication region R1. In the example of FIG. 14, when the vehicle A2 enters the communication region R1 of the communication device 40, the condition acquisition unit 210 of the on-board unit 20 receives a signal indicating the collection condition and the transmission request distributed from the communication device 40. That is, the image acquisition unit 111 of the image information provision device 10 can automatically transmit, via the communication device 40, the collection condition and the transmission request for the captured-image to the on-board unit 20 of the vehicle A2 traveling in the communication region R1 (step S106).

With this configuration, the image information provision device 10 can omit the processing of selecting the target vehicle, and thus the processing load can be reduced.

In a case where a collection point or a collection section is set to a road or a section where the communication device 40 is not installed, the image acquisition unit 111 of the image information provision device 10 may select the target vehicle and transmit the image transmission request using the method of the first or second embodiment.

In the foregoing, certain embodiments of the disclosure have been described, but all of these embodiments are merely illustrative and are not intended to limit the scope of the disclosure. These embodiments may be implemented in various other forms, and various omissions, substitutions, and alterations may be made without departing from the gist of the disclosure. These embodiments and modifications are included in the scope and gist of the disclosure and are also included in the scope of the disclosure described in the claims and equivalents thereof.

For example, in each of the above-described embodiments, an example in which the image information provision device 10 generates and provides real-time monitoring images based on a captured-images collected from the on-board unit 20 has been described, but the disclosure is not limited to this. The image information provision device 10 may acquire, from the on-board unit 20, a captured-image captured when the vehicle passed through the collection point or collection section in the past, and generate and provide an image in a certain time period in the past. For example, when an event such as road debris or an accident occurs on the target road, the image information provision device 10 may collect the captured-images taken at the time when the event appears to have occurred, and generate and provide a verification image.

In the first or second embodiment described above, an example in which the image information provision device 10 selects the target vehicle and transmits the traveling condition and the image transmission request to the target vehicle has been described, but the disclosure is not limited to this. In another embodiment, the on-board unit 20 of each vehicle may transmit probe information including the position of the vehicle to the image information provision device 10 at regular time intervals while traveling on the target road, and inquire whether there is an image transmission request. In this case, in a case where the position of the vehicle that made the inquiry is within a predetermined distance on the upstream side from the collection point or collection section, the image information provision device 10 transmits the collection condition and the image transmission request to this vehicle.

In the example of FIG. 1, an example in which only one image information provision device 10 is provided is described, but the disclosure is not limited to this. In another embodiment, a plurality of image information provision devices 10 may be provided. For example, one image information provision device 10 may be provided for each area divided in units of regions (administrative district, zone divided by certain distance), roads (A highway, B highway, etc.), and the like, and each image information provision device 10 may generate a monitoring image for the target road in the respective area in charge. The image information provision device 10 may be a computer system including a terminal device that is provided on the road side of each area and collects captured-images from the on-board unit 20, and a central device that generates a monitoring image based on the captured-images collected by the terminal device.

Notes

The image information provision device, the on-board unit, the image information provision method, and the program described in the above-described embodiments are to be understood as follows, for example.

(1) According to a first aspect of the disclosure, the image information provision device (10) includes: the setting unit (110) configured to set a collection point or a collection section for an image on a target road; and the image acquisition unit (111) configured to request the on-board unit (20) of a vehicle present within a predetermined range from the collection point or the collection section to transmit a captured-image captured at the collection point or in the collection section, and store, in a storage, a captured-image received from the on-board unit (20) that has received the request.

With this configuration, the image information provision device can collect an image captured by the on-board unit of a vehicle even at a point or in a section of the target road where the fixed camera is not installed. The image information provision device collects a captured-image from the on-board unit only at a collection point or in a collection section of the target road having been set. This makes it possible to reduce a communication load between the image information provision device and the on-board unit.

(2) According to a second aspect of the disclosure, the image information provision device (10) according to the first aspect further includes a travel information acquisition unit (113) configured to acquire probe information including position information of the vehicle from the on-board unit (20), in which, based on the probe information, the image acquisition unit (111) specifies a vehicle located within a predetermined distance on an upstream side from the collection point or the collection section, and requests the on-board unit (20) of the vehicle having been specified to transmit the captured-image.

With this configuration, based on the position of each vehicle indicated in the probe information, the image information provision device can appropriately exclude, from the target vehicle, a vehicle that takes time to arrive at the collection point or the collection section or a vehicle that has already passed through the collection point or the collection section. This allows the image information provision device to more reliably acquire the captured-image of the collection point or the collection section.

(3) According to a third aspect of the disclosure, in the image information provision device (10) according to the first aspect, the image acquisition unit (111) requests, to transmit the captured-image, an on-board unit (20) of a vehicle located within a communication range of a communication device (40) that is installed on an upstream side of the collection point or the collection section of the target road and performs wireless communication with the on-board unit (20).

With this configuration, the image information provision device can omit the processing of selecting the target vehicle, and thus can reduce the processing load.

(4) According to a fourth aspect of the disclosure, in the image information provision device (10) according to any one of the first to third aspects, the setting unit (110) sets, as the collection point or the collection section, a point or a section designated by an inspector of the target road.

With this configuration, the image information provision device can provide monitoring images of various places designated by the inspector without being limited to only fixed points or sections of the target road.

(5) According to a fifth aspect of the disclosure, in the image information provision device (10) according to the second aspect, the setting unit (110) calculates an average speed for each section of the target road based on the probe information, and sets, as the collection section, a section in which the average speed is less than a predetermined threshold.

With this configuration, the image information provision device can automatically set, as a collection section, a section in which the traffic flow is stagnant and generate a monitoring image. By causing the inspector to confirm the automatically generated monitoring image, it becomes possible to quickly find an event (road debris, accident, bad weather, and the like) that causes stagnation.

(6) According to a sixth aspect of the disclosure, in the image information provision device (10) according to any one of the first to fifth aspects, the setting unit (110) sets, as the collection section, a section from a collection start point to a collection end point on the target road, or a section from the collection start point to a point at which the vehicle has traveled for a predetermined time.

With this configuration, the image information provision device can flexibly set the length of the section that can be monitored in the monitoring image.

(7) According to a seventh aspect of the disclosure, the image information provision device (10) according to any one of the first to sixth aspects further includes the image generation unit (112) configured to generate a monitoring image of the collection point or the collection section based on a captured-image received from the on-board unit (20) that has received the request.

With this configuration, the image information provision device can generate a monitoring image in which a discretionary place on the target road can be monitored from an image captured by the on-board unit of the vehicle.

(8) According to an eighth aspect of the disclosure, in the image information provision device (10) according to the seventh aspect, the image generation unit (112) generates, as the monitoring image, a video in which captured-images in the collection section received from a plurality of the on-board units (20) are connected in time series.

With this configuration, the image information provision device can generate a pseudo video as if it were continuously captured by a fixed camera for the collection section having been set.

(9) According to a ninth aspect of the disclosure, the on-board unit (20) mounted in a vehicle includes: the camera (26) configured to capture a captured-image of an area around the vehicle; the positioning unit (25) configured to generate positioning information including a position of the vehicle measured based on a satellite signal; the condition acquisition unit (210) configured to acquire a collection condition indicating a collection point or a collection section for a captured-image to be transmitted to the image information provision device (10); the determination unit (211) configured to determine whether the vehicle has arrived at the collection point or the collection section based on the positioning information; and the image transmission processing unit (212) configured to, in a case where it is determined that the vehicle has arrived at the collection point or the collection section, transmit a captured-image captured by the camera (26) to the image information provision device (10).

With this configuration, the on-board unit only needs to transmit the captured-image to the image information provision device only at the designated point or section, and therefore the communication load with the image information provision device can be reduced.

(10) According to a tenth aspect of the disclosure, an image information provision method includes: setting a collection point or a collection section for an image on a target road; and requesting the on-board unit (20) of a vehicle present within a predetermined range from the collection point or the collection section to transmit a captured-image captured at the collection point or in the collection section, and storing, in a storage, a captured-image received from the on-board unit (20) that has received the request.

(11) According to an eleventh aspect of the disclosure, the program causes the image information provision device (10) to execute: setting a collection point or a collection section for an image on a target road; and requesting the on-board unit (20) of a vehicle present within a predetermined range from the collection point or the collection section to transmit a captured-image captured at the collection point or in the collection section, and storing, in a storage, a captured-image received from the on-board unit (20) that has received the request.

(12) According to the eleventh aspect of the disclosure, the program causes the on-board unit (20) mounted in a vehicle to execute: capturing, by the camera (26), a captured-image of an area around the vehicle; generating positioning information including a position of the vehicle measured based on a satellite signal; acquiring a collection condition indicating a collection point or a collection section for a captured-image to be transmitted to the image information provision device (10); determining whether the vehicle has arrived at the collection point or the collection section based on the positioning information; and, in a case where it is determined that the vehicle has arrived at the collection point or the collection section, transmitting the captured-image captured by the camera (26) to the image information provision device (10).

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. An image information provision device comprising:
a setting unit that sets a collection point or a collection section for an image on a target road;
an image acquisition unit that:
request each of a plurality of on-board units of a respective one of a plurality of vehicles present within a predetermined range from the collection point or the collection section to transmit an image captured at the collection point or in the collection section, and
store, in a storage, a plurality of captured-images that were captured at the collection point or in the collection section and received from the plurality of on-board units; and
an image generation unit that generates, as a monitoring image, a video in which:
the plurality of captured-images captured in the collection section are connected in time series, and
a last frame of one of the plurality of captured images is displayed as a still view until a start of capturing a next one of the plurality of captured images connected in time series.

2. The image information provision device according to claim 1, further comprising:
a travel information acquisition unit that acquires, from each of the plurality on-board units, probe information including position information of the respective one of the plurality of vehicles, wherein
based on the probe information, the image acquisition unit specifies, from among the plurality of vehicles, a vehicle located within a predetermined distance on an upstream side from the collection point or the collection section, and requests the on-board unit of that specified vehicle to transmit the captured-image.

3. The image information provision device according to claim 2, wherein the setting unit calculates an average speed for each section of the target road based on the probe information, and sets, as the collection section, a section in which the average speed is less than a predetermined threshold.

4. The image information provision device according to claim 1, wherein the image acquisition unit:
specifies, from among the plurality of vehicles, a vehicle located within a communication range of a communication device installed on an upstream side of the collection point or the collection section of the target road,
requests the on-board unit of that specified vehicle to transmit the captured image, and performs wireless communication with that on-board unit.

5. The image information provision device according to claim 1, wherein the setting unit sets, as the collection point or the collection section, a point or a section designated by an inspector of the target road.

6. The image information provision device according to claim 1, wherein the setting unit sets, as the collection section, a section from a collection start point to a collection end point on the target road, or a section from the collection start point to a point at which the vehicle has traveled for a predetermined time.

7. An image information provision method comprising:
- setting, by an image information provision device, a collection point or a collection section for an image on a target road;
- requesting, by the image information provision device, each of a plurality of on-board units of a respective one of a plurality of vehicles present within a predetermined range from the collection point or the collection section to transmit an image captured at the collection point or in the collection section;
- storing, by the image information provision device, in a storage, a plurality of captured-images that were captured at the collection point or in the collection section and received from the plurality of on-board units; and
- generating, by the image information provision device, as a monitoring image, a video in which:
  - the plurality of captured-images captured in the collection section are connected in time series, and
  - a last frame of one of the plurality of captured-images is displayed as a still view until a start of capturing a next one of the plurality of captured-images connected in time series.

8. A non-transitory computer readable medium storing instructions that cause an image information provision device to execute processing comprising:
- setting a collection point or a collection section for an image on a target road;
- requesting each of a plurality of on-board units of a respective one of a plurality of vehicles present within a predetermined range from the collection point or the collection section to transmit an image captured at the collection point or in the collection section;
- storing, in a storage, a plurality of captured-images that were captured at the collection point or in the collection section and received from the plurality of on-board units; and
- generating, as a monitoring image, a video in which:
  - the plurality of captured-images captured in the collection section are connected in time series, and
  - a last frame of one of the plurality of captured-images is displayed as a still view until a start of capturing a next one of the plurality of captured-images connected in time series.

* * * * *